United States Patent
Putman

(10) Patent No.: US 9,432,500 B2
(45) Date of Patent: Aug. 30, 2016

(54) SYSTEMS, METHODS, AND COMPUTER-READABLE MEDIA FOR TIMER-BASED MANAGEMENT OF COMMUNICATION DEVICES

(71) Applicant: FedEx Corporate Services, Inc., Collierville, TN (US)

(72) Inventor: John David Putman, Olive Branch, MS (US)

(73) Assignee: FEDEX CORPORATE SERVICES, INC., Collierville, TN (US)

( * ) Notice: Subject to any disclaimer, the term of this patent is extended or adjusted under 35 U.S.C. 154(b) by 0 days.

(21) Appl. No.: 14/794,921

(22) Filed: Jul. 9, 2015

(65) Prior Publication Data
US 2016/0021240 A1 Jan. 21, 2016

Related U.S. Application Data

(63) Continuation of application No. 13/868,770, filed on Apr. 23, 2013, now Pat. No. 9,107,046.

(60) Provisional application No. 61/642,723, filed on May 4, 2012.

(51) Int. Cl.
*H04M 1/725* (2006.01)
*H04W 4/04* (2009.01)
*H04W 52/02* (2009.01)

(52) U.S. Cl.
CPC ......... *H04M 1/72577* (2013.01); *H04W 4/046* (2013.01); *H04W 52/0274* (2013.01); *H04W 52/0254* (2013.01)

(58) Field of Classification Search
CPC .................... H04M 1/72566; H04M 1/72577; H04M 3/02; H04W 48/02; H04W 4/027; H04W 4/046
See application file for complete search history.

(56) References Cited

U.S. PATENT DOCUMENTS

| | | | | |
|---|---|---|---|---|
| 6,040,781 A * | 3/2000 | Murray | .................. | H04L 29/06 340/4.31 |
| 8,874,459 B1 * | 10/2014 | Green | .................... | G06Q 10/02 701/120 |
| 2004/0268215 A1 * | 12/2004 | Trossen | ............... | G06Q 10/109 455/418 |
| 2007/0026850 A1 * | 2/2007 | Keohane | ............. | H01M 1/6075 455/418 |
| 2010/0075648 A1 * | 3/2010 | Matsuoka | ......... | H04M 1/72566 455/418 |
| 2010/0267375 A1 * | 10/2010 | Lemmon | ................. | G06F 21/74 455/418 |
| 2011/0053584 A1 * | 3/2011 | Cook | ...................... | H04M 3/02 455/419 |
| 2011/0125454 A1 * | 5/2011 | Wengler | ................. | G01P 13/00 702/141 |
| 2012/0300598 A1 * | 11/2012 | Murray | .................. | G04G 13/02 368/251 |

OTHER PUBLICATIONS

PCT Notification of Transmittal of the International Search Report and the Written Opinion of the International Searching Authority, or the Declaration for International Application No. PCT/US2013/038459 mailed Jul. 24, 2013 (8 pages).

* cited by examiner

*Primary Examiner* — Kashif Siddiqui
(74) *Attorney, Agent, or Firm* — Finnegan, Henderson, Farabow, Garrett & Dunner, LLP

(57) ABSTRACT

A method of management of a communication device in an aircraft may include transitioning the communication device from a normal mode to a disabled mode based on a calculated device sleep time based on data associated with transportation information of the device. One of these modes may be a state of the device in which a transceiver of the device is deactivated and the other mode may be a state of the device in which the transceiver is activated. Therefore, the device sleep time determines when the wireless device's transceiver may not be activated.

20 Claims, 3 Drawing Sheets

SYSTEMS, METHODS, AND COMPUTER-READABLE MEDIA FOR TIMER-BASED MANAGEMENT OF COMMUNICATION DEVICES

CROSS-REFERENCE TO RELATED APPLICATIONS

This application claims the benefit of prior-filed U.S. Provisional Application No. 61/642,723, filed May 4, 2012, which is hereby incorporated by reference.

TECHNICAL FIELD

This disclosure generally relates to systems, methods, and computer-readable media for automatic management of communication devices.

BACKGROUND

The increasing use of cellular telephones and other communication devices in recent years has made the enforcement of federal regulations on their airborne use difficult. Unauthorized use of cellular devices on aircraft poses a risk, for example, of electromagnetic interference (EMI) to the communication components of commercial and cargo aircraft. With the widespread use of cell phones and other communication devices on board aircraft, and the difficulty of enforcing regulations restricting such use, it would be beneficial to automate compliance with the applicable regulations. Automating compliance with the applicable regulations would also aid in power conservation of the devices when they are airborne.

SUMMARY

In accordance with one example embodiment, a method of managing a device in an aircraft is disclosed. The method comprises receiving transportation information associated with a device, including at least one of data representing delivery origin information, expected travel time for transport of the device from an origin to a destination, delivery destination information, an expected delivery time of the device, and schedule details of one or more transport vehicles associated with delivery of the device from the origin to the destination, calculating a device sleep time based on the received transportation information. The method further comprises transitioning the device from a normal mode in which the device is powered on to a disabled mode in which the device is inactivated based on the device sleep time, and automatically transitioning the device from the disabled mode to the normal mode after expiration of the device sleep time.

In accordance with another example embodiment, a system for managing a device in an aircraft is disclosed. The system comprises a processor for executing program instructions for management of the device, a non-transitory computer-readable storage medium for storing the program instructions, the processor when executing the program instructions: receives transportation information associated with a device, including at least one of data representing delivery origin information, expected travel time for transport of the device from an origin to a destination, delivery destination information, an expected delivery time of the device, and schedule details of one or more transport vehicles associated with delivery of the device from the origin to the destination, calculates a device sleep time based on the received transportation information, transitions the device from a normal mode in which the device is powered on to a disabled mode in which the device is inactivated based on the device sleep time, and automatically transitions the communication device from the disabled mode to the normal mode after expiration of the device sleep time.

In accordance with another example embodiment, a non-transitory computer-readable storage medium storing program instructions, which, when executed by a processor, cause the processor to perform a method of management of a communication device aboard an aircraft. The method comprising the steps of receiving transportation information associated with a device, including at least one of data representing delivery origin information, expected travel time for transport of the device from an origin to a destination, delivery destination information, an expected delivery time of the device, and schedule details of one or more transport vehicles associated with delivery of the device from the origin to the destination, calculating a device sleep time based on the received transportation information, transitioning the device from a normal mode in which the device is powered on to a disabled mode in which the device is inactivated based on the device sleep time, and automatically transitioning from the disabled mode to the normal mode after expiration of the device sleep time.

BRIEF DESCRIPTION OF THE DRAWINGS

The accompanying drawings, which are incorporated in and constitute a part of this specification, illustrate embodiments.

DETAILED DESCRIPTION

In some embodiments according to this disclosure a communication device receives transportation information such as delivery-origin information, expected travel time for transport of the device from an origin to a destination, and/or schedules of vehicles used for transport of the device between an origin and a destination. This information is utilized to generate a device sleep time, that is, a time at the expiry of which the wireless device returns to a normal mode from other operational modes. For example, when the device is a smart phone, the phone may acquire transportation information using a number of communication techniques, such as utilizing a wireless connection to connect with a logistics database containing flight schedules. Upon receipt of a flight schedule associated with a device, the device may then generate a device sleep time. For example, if an aircraft is scheduled to take off at 8 a.m. for a one-hour flight, the device sleep time may be determined to be from 8 a.m. to 9 a.m. Accordingly, the device may be disabled during that time, but after expiration of the device sleep time at 9 a.m., the device may be powered on and be operable again.

In some embodiments the device has multiple operational modes, such as, for example: a normal mode, airplane mode, and disabled mode. The three operational modes are described below in further detail with respect to FIGS. 1-3.

In some embodiments, a Wireless Management System (WMS) may be used to control a communication device. A WMS is a management system stored on the device that utilizes a processor to control the device. Accordingly, the method of operation described below with respect to FIG. 2 and additional methods consistent with disclosed embodiments may be implemented by the WMS.

Figure 1:
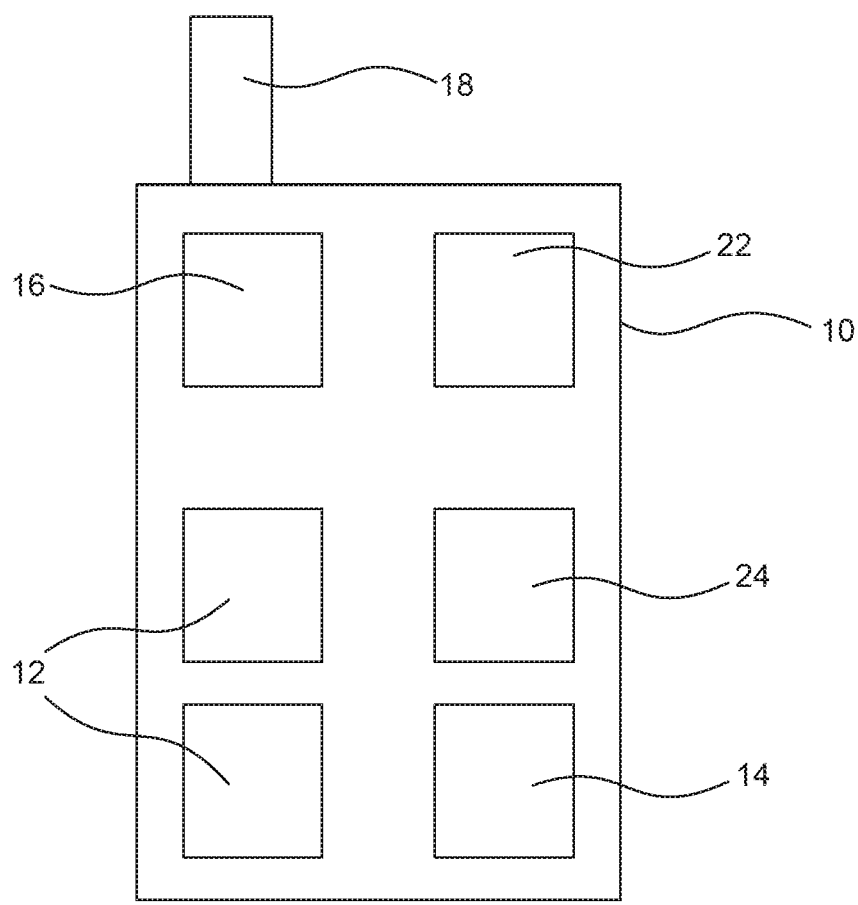
FIG. 1 illustrates an example wireless device for implementing the disclosed embodiments.

FIG. 1 illustrates a schematic of an example embodiment of a communication device 10. The communication device 10 may include, among other things, one or more sensors 12 and one or more processors 14. Processor 14 may be any type of processor known in the art (such as, for example, CPUs, ASICs, FPGAs, etc.). Processor 14 performs steps or methods consistent with disclosed embodiments by, for example, reading software instructions from a memory 24 of device 10, and executing the instructions. Although the memory 24 is shown as a separate component from processor 14 in FIG. 1, it is contemplated that, in some embodiments, memory 24 may be a part of processor 14. It is also contemplated that in some embodiments the memory 24 may be a portable memory device, such as, for example, a flash memory card, a secure digital memory card, a memory stick, etc. Memory 24 may include one or more memory or storage devices that also store data.

In some embodiments, sensor(s) 12 measure the environmental parameters associated with the communication device 10, and programmed processor 14 monitors the measured environmental parameters real-time, for example, during aircraft operation. Sensor(s) 12 may include, for example, an accelerometer configured to measure the acceleration or motion of device 10, and/or a pressure sensor that is configured to measure the pressure associated with the device 10. In some embodiments, communication device 10 may also include a transceiver 16 configured to transmit and receive wireless signals. These wireless signals are made up of electromagnetic radiations propagated into the atmosphere by an antenna 18.

In some embodiments, communication device 10 is configured to transition among different operational modes based on instructions from processor 14. The operational modes may include a normal mode and a disabled mode. In some embodiments, the operational modes may also include an airplane mode. Normal mode represents a state of the device 10 when it is fully powered on and fully operational. Therefore, in a normal mode, transceiver 16 is operational and able to transmit and receive data. In an airplane mode, transceiver 16 is powered off or configured to not send or receive data, although the device 10 is otherwise operational. Disabled mode may represent a state of device 10, in which device 10 is fully or partially inactivated and the transceiver 16 is powered off or configured to not send or receive data. That is, device 10 is not operational but some of its components may still be powered-on. For example, some systems, such as wake-up mechanism 22, may be active even when device 10 is in disabled mode. In some embodiments, wake-up mechanism 22 enables device 10 to transition from disabled mode to another mode (such as normal mode or airplane mode). In some embodiments, wake-up mechanism 22 also enables device 10 to transition from airplane mode to another mode (such as normal mode). Wake-up mechanism 22 may maintain a system time, or data associated with a system time, even when the device is inactivated and some of its components are powered off. When device 10 is in the airplane mode or the disabled mode, the device 10 may emit less electromagnetic radiation than when device 10 is in the normal mode.

Figure 2:
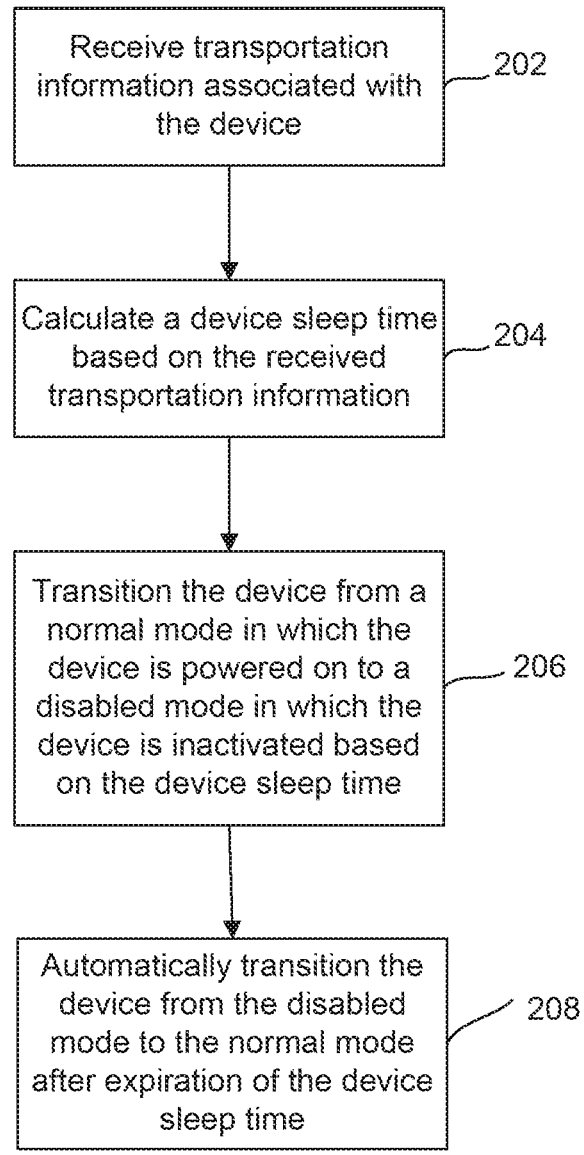
FIG. 2 illustrates an example flow chart of an example method of operation for automatic power management of a wireless device.

FIG. 2 is a flow chart illustrating an example method of operation 200 for automatic power management of a device. Specifically, for example, method 200 may be used to control device 10 of FIG. 1. The method of operation 200 may be embodied in a set of program instructions or software stored in memory 24 of device 10 that may be executed by processor 14 to control device 10.

Method 200 begins with step 202, wherein a device receives transportation information associated with the device. The transportation information may include, for example, one or more or a combination of the following: data representing delivery-origin information, expected travel time for transport of the device from an origin to a destination, delivery-destination information, an expected delivery time of the device, and schedule details of one or more transport vehicles associated with delivery of the device from the origin to the destination.

Delivery-origin information associated with the device, as well as delivery-destination information associated with the device, may include information regarding physical location, for example, country, state, postal code, etc. Delivery-origin information and delivery-destination information may also reflect the local time at the origin and destination, respectively, along with the relationship between the local times or between each respective local time and the Coordinated Universal Time (UTC) or a similar time reference.

Expected travel time for transportation of the device from an origin to a destination, may include, or may be derived from, the time from which the device is expected to leave the origin and the time the device is expected to arrive at the destination. The expected travel time is not limited to the schedule details of one or more transport vehicles utilized during the transportation but may also include expected static time or other relevant information dealing with transportation. For example, if a wireless device is being transported on a courier vehicle and then a cargo aircraft, the expected travel time may include a loading time during which items may be transferred from the courier vehicle to the cargo aircraft.

The expected delivery time may include the time that a wireless device is expected to be delivered to a final destination. For example, a cargo airplane may arrive in the destination city at a particular time. However, the wireless device may not be expected to be delivered to the final destination until hours later, following transfer to a land-based vehicle for transport from the plane to the destination address.

The schedule details of one or more transport vehicles may include schedules of vehicles on which a device is to be transported from its origin to destination, including, but not limited to flight schedules, train schedules, delivery vehicle schedules, etc. The schedules may include additional related information as well, including additional flight schedules, so that alternative transport situations may be accounted for.

For example, device 10 may communicate wirelessly with a remote server containing shipment information about the device and download shipment related information to the device. This information may include, among others, the origin and destination address, the route that the package will take during shipment, and the mode of transportation of the package. If the package will be transported in an aircraft during any leg of the shipment, the information downloaded may also include flight details such as flight times and the airports that the package may be transported through during shipment. Geofences, virtual perimeters for real-world geographic areas, associated with the identified airports may also be calculated and downloaded to the device.

Additionally, in some embodiments, the step of receiving the schedule details of the one or more transport vehicles for anticipated delivery of the device further includes receiving updated data that indicates changes in the schedule details. For example, if a flight is delayed, an updated flight schedule may be sent to the device. The updated data may only be received when a transceiver in the wireless device is powered on and is therefore able to receive data.

For example, device 10 may communicate with a remote server at predetermined intervals to download updated data, if available. This interval may be determined based on known information about the shipping system, such as package scanning before aircraft takeoff, etc. For example, if a package containing device 10 is scanned before being loaded on a cargo aircraft, the device 10 may communicate with the remote server to see if any changes may have occurred to the cargo aircraft's flight schedule. The downloaded information may be used to determine a time window (or update the time window) within which the package may be placed in an aircraft.

In step 204, a device sleep time may be calculated based on the received transportation information. The device sleep time refers to a time period when the device does not operate in a normal mode, that is, the device operates in a disabled mode or an airplane mode as described above. Accordingly, the device sleep time refers to a time period when a transceiver in the device is powered off. For example, the received information may indicate that the time at the origin is currently 2 p.m. and an airplane is scheduled to fly at 3 p.m. for a one-hour flight to the destination. Accordingly, in the example, the device sleep time may cause the device to operate in disabled mode during at least the scheduled one hour of flight, that is, from 2 p.m. to 3 p.m., at the expiration of which the device would return to normal mode.

In some further embodiments, additional time buffers based on statistics or user selection may be utilized to calculate the device sleep time. For example, a buffer of fifteen minutes may be added to the device sleep time on each side of the scheduled flight time to ensure that if a plane takes off early or lands late, the device is still not operating in normal mode. Additional, time buffers may be added to the device sleep time if statistically the flight often lands later than scheduled.

In other embodiments, the device sleep time may be calculated in reference to the expected delivery time at the final destination. For example, after an airplane lands in a destination city, it may take 15 hours for the device to be ultimately delivered to the final destination by courier. Accordingly, when the device is delivered, its battery not only retains a charge but while being transported, the device does not add interferences to any other communication devices and complies with regulations.

As explained in further detail in steps 206 and 208, the device sleep time may be utilized for transitioning the device between normal and other operating modes.

In some embodiments, calculating the device sleep time includes calculating a start time for automatically initiating a transition of the device from a normal mode to a disabled mode. Calculating the device sleep time may further include calculating an end time, at the expiration of which, an automatic transition of the device from the disabled mode to the normal mode is initiated.

In step 206, the device may transition from a normal mode to a disabled mode. In the normal mode the device may be powered on and operational while in the disabled mode the device may be inactivated. For example, based on a received flight schedule, the device sleep time may be calculated to start at a particular time that the airplane is scheduled to take off. Accordingly, the device may transition from the normal mode to the disabled mode at the time the airplane is scheduled to take off.

In some embodiments, an airplane may take off prematurely with respect to the calculated sleep device time. In such a situation, the device may initiate transition from the normal mode to the disabled mode based on receipt of data indicative of an aircraft takeoff. Therefore, if the aircraft takes off unexpectedly, the device may still transition to the disabled mode. For example, sensors 12 of device 10 may be used to detect an aircraft takeoff. In some embodiments, the data indicative of the aircraft takeoff may be acquired by a sensor 12 which may be an accelerometer or a pressure sensor embedded in the device.

In step 208, the device may automatically transition from the disabled mode to the normal mode after expiration of the device sleep time. For example, if a wireless device is scheduled to be aboard an airplane for an hour, the device sleep time may be scheduled to be for an hour and a half including time before takeoff and after landing. Therefore, in this example, the device would transition back to the normal mode after expiration of an hour and a half, where the device and transceiver are both powered on and activated for normal usage.

In some embodiments, the device sleep time is not a period of time but rather a specific time. For example, the calculated device sleep time may be a period of time starting at 8 a.m. lasting for an hour or simply from 8 a.m. to 9 a.m, both of which essentially are the same. Accordingly, no matter what triggering event (device sleep time or premature takeoff of an aircraft) leads to the transition from a normal mode, the device sleep time represents the time at the expiration of which, the device will transition back to the normal mode. For example, if the expected delivery time is 3 p.m. at a residential address and the device sleep time requires that the device transition to normal mode at 2:45 p.m., the device will transition back to normal mode at 2:45 p.m. whether it originally transitioned out of the normal mode based on a time that was calculated as part of the device sleep time, due to detection of an aircraft takeoff, or due to some other reason.

In additional embodiments, the method may further include additional steps between step 206 and step 208. One additional step may include automatically transitioning the device from the disabled mode to an airplane mode using the processor after takeoff of the aircraft. Detection of an airplane takeoff may initiate the transition from the disabled mode to the airplane mode. Airplane takeoff may be determined from data from sensors within the device that are configured to sense takeoff or from data from an external source such as a source controlled by the aircraft systems.

Another additional step may include automatically transitioning the device from the airplane mode back to the disabled mode using the processor during descent of the aircraft on receipt of data indicative of aircraft descent or aircraft landing. That is, detection of the aircraft descent or landing would initiate the transition from the airplane mode back to the disabled mode.

In additional embodiments, the transportation information received in step 202 may first be stored before calculating the device sleep time. For example, the received data may be stored in memory 24 of device 10.

Figure 3:
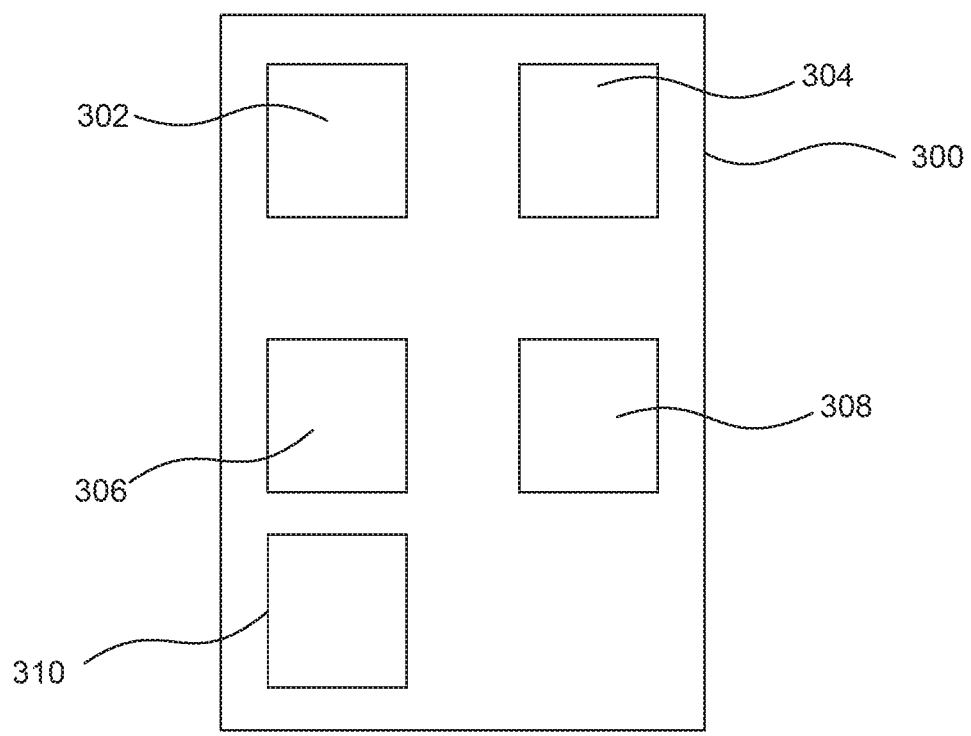
FIG. 3 illustrates an example memory storing received transportation information according to an example embodiment.

FIG. 3 illustrates an example memory storing received transportation information according to an example embodiment. Memory 300 may be similar to memory 24. Memory 300 stores the received transportation information as data

302, 304, 306, 308, and 310. For example, data 302 may include data representing delivery-origin information, data 304 may include expected travel time for transportation of the device from an origin to a destination, data 306 may include delivery-destination information, data 308 may include an expected delivery time of the device, and data 310 may include schedule details of one or more transport vehicles associated with delivery of the device from the origin to the destination.

Data 302, 304, 306, 308, and 310, represents transportation information stored in memory 300 that may be utilized to determine the device sleep time. For example, the sleep device time may be calculated using data 302 (delivery-origin information, for example, the local time at the origin) and data 310 (schedule details of one or more transport vehicles associated with delivery of the device from the origin to the destination). Therefore, if the data stored in memory 300 indicates that the transportation vehicle will be air borne from 2 p.m. to 3 p.m. EST and the current local time is 1:30, p.m. EST, then it may be calculated that the device sleep time begins in half an hour and lasts for an hour after that.

Although the inventive aspects of the current disclosure are described with reference to a communication device 10 in an aircraft transitioning among different modes in the sequence illustrated in FIG. 2, the systems and methods of the current disclosure may be more widely used. In some embodiments, a WMS may transition device 10 in a different sequence. For example, WMS may transition device 10 from normal mode to airplane mode and/or from airplane mode back to normal mode or to a different mode (such as, for example, disabled mode) based on the device sleep time.

The following is an example algorithm for determining a device sleep time consistent with exemplary embodiments that may be implemented, for example, as program instructions stored in memory executed by a processor:

```
Step01:
Store Device (UTC) Format time as Origin_Current_UTC_DateTime
Origin_Current_Local_DateTime =
    Origin_Current_UTC_DateTime
    + ((Non_DST_Offset_Hours at NITZ_Time_Code in table matching
        NITZ Indicator Time Zone from device data)
    +
    (NITZ Indicator DST Adjustment from device data))
        Note: Functions in JAVA or Oracle may be utilized to determine
            this be used to determine this.
Step02:
Determine the Origin_Local_Day of the Week from
        Origin_Current_Local_DateTime
        Note: Functions associated with standard or highly used computer
            languages and database facilities may be applied to make
this
            determination; for example, such facilities are available in
the
            JAVA language or from the Oracle database system.
Step03:
Delivery_Date_Adj_Hours = 0
If the Origin_Local_Day is Friday / 6 and NO Saturday Delivery Option
Then
    Delivery_Date_Adj_Hours = 55.5 Hours [All of Saturday and Sunday
        plus 7.5 hours from Midnight to 0730 on Monday which is the
        delivery day]
Else
If Origin_Local_Day is Saturday / 7
Then
    Delivery_Date_Adj_Hours = 31.5 Hours [All of Sunday plus 7.5
        hours from Midnight to 0730 on Monday the delivery day]
Else
    Delivery_Date_Adj_Hours = 7.5 Hours [Midnight to 07:30 the next
    day.
        Note: A table for company holidays and additional steps will be
            involved relative to those. For instance, If the
            Origin_Local_Day is Thursday and
            Friday is a holiday and NO Saturday Delivery Option,
            Then Delivery_Date_Adj_Hours =
            79.5 Hours [All of Friday and Saturday and Sunday
            plus 7.5 hours from Midnight to 0730 on Monday the
            delivery day]
Step04:
Delivery_Date_Adj_Hours =
    Delivery_Date_Adj_Hours
    + (24 Hours Minus Origin_Current_Local_Time) [Adds in the current
        time left in the Origin Day]
Step05:
Table Look up and store Origin_St_Offset using NITZ_Time_Code
    from device to find that.
        Note: The Origin NITZ_Time_Code is known because the device
            provides it but is not known for the destination. Accordingly,
            the determination is biased to the time zone covering the
            majority of a state, though NITZ_Time_Code
            may still be utilized.
If Destination_St = 'IN'
Then
Destination_St_Offset = offset at NITZ_Time_Code 040
Else
If Destination_St = 'AZ'
Then
Destination_St_Offset = offset at NITZ_Time_Code 015
Else
Table Look up using State for Destination_ St_Offset
Step06:
Time_Zone_Change_Adj_Hours = 0
If Origin_St_Offset NOT = Destination_St_Offset
Then
    Time_Zone_Change_Adj_Hours = ABS(Destination_St_Offset) +
        Origin_St_Offset
Else
If Origin_St_Offset < Destination_St_Offset
Then
    Time_Zone_Change_Adj_Hours = (Origin_St_Offset) +
        ABS(Destination_St_Offset)
Step07:
Count_Down_Hours = Time_Zone_Change_Adj_Hours +
    Delivery_Date_Adj_Hours
Step08:
Countdown_Timer = Routine to convert Count_Down_Hours to
    whatever units device countdown timer works best using
        Note: ORACLE has extremely rich date/time functions that may be
            utilized for this step including the Countdown_Timer being
            represented as a date/time or time in hours and minutes and
            seconds or time in minutes or time in seconds, etc.
Step09:
Host sends a configuration with the Countdown_Timer for the device to
use.
        Note: Additional accuracy is possible in that some adjustment for
            the time between the device report being sent (which has
            its time) and the configuration being sent could also be
            taken into account by the host for slight adjustment out
            of the Countdown_Timer.
```

The following is a scenario utilizing an example algorithm for determining a device sleep time consistent with exemplary embodiments that may be implemented, for example, as program instructions stored in memory executed by a processor:

```
AL as Origin to CA as Destination, non-DST
Origin_Current_UTC_DateTime = 2011/04/12 18:00:00
Step01:
    Origin_Current_Local_DateTime =
    Origin_Current_UTC_DateTime
    + ((Non_DST_Offset_Hours at NITZ_Time_Code in table
      matching NITZ Indicator Time Zone from device data)
    Origin_Current_Local_DateTime =
    2011/04/12 18:00:00
    + (−6)
    = 2011/04/12 12:00:00
```

-continued

```
Step02:
    Day of the Week is Tuesday / 2
Step03:
    Delivery_Date_Adj_Hours = 7.5 Hours
Step04:
    Delivery_Date_Adj_Hours =
      Delivery_Date_Adj_Hours
        + (24 Hours Minus Origin_Current_Local_Time)
      = 7.5 + (24 − 12) = 7.5 + 12 = 19.5
Step05:
    Origin_St_Offset using NITZ_Time_Code of 020 = −6
    Table Look up using State 'CA' for Destination_ St_Offset = −8
Step06:
    Origin_St_Offset NOT = Destination_St_Offset a −6 NOT = −8
    Time_Zone_Change_Adj_Hours = ABS(Destination_St_Offset) +
      Origin_St_Offset
      = ABS(−8) + (−6) = 8 − 6 = 2
Step07:
    Count_Down_Hours = Time_Zone_Change_Adj_Hours +
      Delivery_Date_Adj_Hours
      = 2 + 19.5 = 21.5
```

The following is another scenario utilizing an example algorithm for determining a device sleep time consistent with exemplary embodiments that may be implemented, for example, as program instructions stored in memory executed by a processor:
  CA as Origin to AL as Destination, non-DST
  Origin_Current_UTC_DateTime=2011/04/12 18:00:00

```
Step01:
    Origin_Current_Local_DateTime =
      Origin_Current_UTC_DateTime
        + ((Non_DST_Offset_Hours at NITZ_Time_Code in table
          matching NITZ Indicator Time Zone from device data)
    Origin_Current_Local_DateTime =
      2011/04/12 18:00:00
      + (−8)
      = 2011/04/12 10:00:00
Step02:
    Day of the Week is Tuesday / 2
Step03:
    Delivery_Date_Adj_Hours = 7.5 Hours
Step04:
    Delivery_Date_Adj_Hours =
      Delivery_Date_Adj_Hours
        + (24 Hours Minus Origin_Current_Local_Time)
      = 7.5 + (24 − 10) = 7.5 + 14= 21.5
Step05:
    Origin_St_Offset using NITZ_Time_Code of 020 = −8
    Table Look up using State 'CA' for Destination_ St_Offset = −6
Step06:
    Origin_St_Offset NOT = Destination_St_Offset a −8 NOT = −6
    Time_Zone_Change_Adj_Hours = ABS(Destination_St_Offset) +
      Origin_St_Offset
      = ABS(−6) + (−8) = 6 − 8 = −2
Step07:
    Count_Down_Hours = Time_Zone_Change_Adj_Hours +
      Delivery_Date_Adj_Hours
      = −2 + 21.5 = 19.5
```

In embodiments, if the device sleep time expires while an airplane is still in flight, the device may return to the disabled or airplane mode and may reset the device sleep time. For example, the re-sleep time may be determined based on an average or maximum flight time for a transportation network, based on average or maximum flight times between and origin and destination, routing prediction, or arbitrary choice. A new device sleep time is calculated allowing the device to return to normal mode at a later The following is an example algorithm for determining a new device sleep time when a device turns on while in flight consistent with exemplary embodiments that may be implemented, for example, as program instructions stored in memory executed by a processor:

```
Step01:
    Upon wakeup, query other factors / indicators to determine if still "in
      flight" (in any state under which continued quiescence of certain
      operations are desired).
    If still "in flight"
    Then
      Increment "re-sleep" occurrences
      Store current re-sleep timer value
      Re-sleep timer = initial re-sleep timer plus (re-sleep increment time
        re-sleep occurrences).
      If Re-sleep timer < minimum re-sleep timer
      Then
      Set re-sleep timer = minimum re-sleep timer.
      Re-enter airplane mode.
Step02:
    Store current re-sleep timer value.
    If no "in-flight" indication from Step01
    Then
      Attempt acquisition of cell tower signal (or any other appropriate
        indication) over allowed period of time / number of acquisition
        retries
      If timer or retries expire
      Then
        Increment "re-sleep" occurrences
        Re-sleep timer = initial re-sleep timer plus (re-sleep increment
          time re-sleep occurrences).
        If Re-sleep timer < minimum re-sleep timer
        Then
        Set re-sleep timer = minimum re-sleep timer
        Set tower acquisition failure.
        Re-enter airplane mode.
Step03:
    If "in flight" or tower acquisition failure
    Then
      Sleep until re-sleep timer expires.
```

Embodiments and all of the functional operations described in this specification can be implemented in digital electronic circuitry, or in computer software, firmware, or hardware, including the structures disclosed in this specification and their structural equivalents, or in combinations of them. Embodiments can be implemented as one or more computer program products, i.e., one or more modules of computer program instructions encoded on a computer readable medium, e.g., a machine readable storage device, a machine readable storage medium, a memory device, or a machine readable propagated signal, for execution by, or to control the operation of, data processing apparatus.

The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of them. A propagated signal is an artificially generated signal, e.g., a machine-generated electrical, optical, or electromagnetic signal, which is generated to encode information for transmission to suitable receiver apparatus.

A computer program (also referred to as a program, software, an application, a software application, a script, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification (e.g., FIG. 2) can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit). While disclosed processes include particular process flows, alternative flows or orders are also possible in alternative embodiments.

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for executing instructions and one or more memory devices for storing instructions and data. Generally, a computer will also include, or be operatively coupled to, a communication interface to receive data from or transfer data to, or both, one or more mass storage devices for storing data, e.g., magnetic, magneto optical disks, or optical disks.

Moreover, a computer can be embedded in another device. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto optical disks; and CD ROM and DVDROM disks. The processor and the memory can be supplemented by, or incorporated in, special purpose logic circuitry.

To provide for interaction with a user, embodiments of the invention can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Embodiments can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the invention, or any combination of such back end, middleware, or front end components. The components of the system can be interconnected by any form or medium of digital data communication, e.g., a communication network.

Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client/server relationship to each other.

Certain features which, for clarity, are described in this specification in the context of separate embodiments, may also be provided in combination in a single embodiment. Conversely, various features which, for brevity, are described in the context of a single embodiment, may also be provided in multiple embodiments separately or in any suitable sub-combination. Moreover, although features may be described above as acting in certain combinations and even initially claimed as such, one or more features from a claimed combination can in some cases be excised from the combination, and the claimed combination may be directed to a subcombination or variation of a subcombination.

Particular embodiments have been described. Other embodiments are within the scope of the following claims.

The invention claimed is:

1. A method performed by one or more processors, the method comprising:
   calculating a device sleep time based on received transportation information associated with the device;
   adjusting the device sleep time by adding a time buffer to the device sleep time;
   transitioning the device from a powered on mode to a disabled mode; and
   automatically transitioning the device from the disabled mode to the powered on mode after expiration of the adjusted device sleep time.

2. The method of claim 1, further comprising:
   calculating the time buffer based on a statistical schedule delay for an aircraft carrying the device.

3. The method of claim 1, further comprising:
   determining, upon expiration of the adjusted device sleep time, whether an aircraft carrying the device is in flight;
   calculating, responsive to determining the aircraft is in flight, a device re-sleep time;
   transitioning the device from the powered on mode to the disabled mode; and
   automatically transitioning the device from the disabled mode to the powered on mode after expiration of the device re-sleep time.

4. The method of claim 3, wherein calculating the device re-sleep time includes:
   calculating the device re-sleep time based on average flight times between an origin and a destination associated with the flight.

5. The method of claim 1, wherein calculating the device sleep time includes:
   calculating an initial start time and an initial end time.

6. The method of claim 5, wherein adjusting the device sleep time by adding a time buffer includes:
   calculating an adjusted start time, the adjusted start time corresponding to a specific point in time prior to the initial start time.

7. The method of claim 6, wherein adjusting the device sleep time by adding a time buffer includes:
   calculating an adjusted end time, the adjusted end time corresponding to a specific point in time after to the initial end time.

8. The method of claim 7, wherein transitioning the device from the powered on mode to the disabled mode includes:
initiating, at the adjusted start time, transition of the device from the powered on mode to the disabled mode.

9. The method of claim 7, automatically transitioning the device from the disabled mode to the powered on mode includes:
initiating, at the adjusted end time, transition of the device from the disabled mode to the powered on mode.

10. The method of claim 1, further including automatically transitioning the device from the disabled mode to an airplane mode responsive to receiving data indicative of at least one of an aircraft takeoff and an aircraft reaching a cruise altitude, the airplane mode being a state of the device wherein the device is powered on but a transceiver of the device is powered off.

11. A system for management of a device, comprising:
a memory device that stores a set of instructions; and
at least one processor that executes the set of instructions to perform a method, including:
calculating a device sleep time based on received transportation information associated with the device;
adjusting the device sleep time by adding a time buffer to the device sleep time;
transitioning the device from a powered on mode to a disabled mode; and
automatically transitioning the device from the disabled mode to the powered on mode after expiration of the adjusted device sleep time.

12. The system of claim 11, wherein the method further comprises:
calculating the time buffer based on a statistical schedule delay for an aircraft carrying the device.

13. The system of claim 11, wherein the method further comprises:
determining, upon expiration of the adjusted device sleep time, whether an aircraft carrying the device is in flight;
calculating, responsive to determining the aircraft is in flight, a device re-sleep time;
transitioning the device from the powered on mode to the disabled mode; and
automatically transitioning the device from the disabled mode to the powered on mode after expiration of the device re-sleep time.

14. The system of claim 13, wherein calculating the device re-sleep time includes:
calculating the device re-sleep time based on average flight times between an origin and a destination associated with the flight.

15. The system of claim 11, wherein calculating the device sleep time includes:
calculating an initial start time and an initial end time.

16. The system of claim 15, wherein adjusting the device sleep time by adding a time buffer includes:
calculating an adjusted start time, the adjusted start time corresponding to a specific point in time prior to the initial start time.

17. The system of claim 16, wherein adjusting the device sleep time by adding a time buffer includes:
calculating an adjusted end time, the adjusted end time corresponding to a specific point in time after to the initial end time.

18. The system of claim 17, wherein transitioning the device from the powered on mode to the disabled mode includes:
initiating, at the adjusted start time, transition of the device from the powered on mode to the disabled mode.

19. The system of claim 17, automatically transitioning the device from the disabled mode to the powered on mode includes:
initiating, at the adjusted end time, transition of the device from the disabled mode to the powered on mode.

20. A non-transitory computer-readable medium comprising instructions that, when executed by at least one processor, cause the at least one processor to perform operations including:
calculating a device sleep time based on received transportation information associated with the device;
adjusting the device sleep time by adding a time buffer to the device sleep time;
transitioning the device from a powered on mode to a disabled mode; and
automatically transitioning the device from the disabled mode to the powered on mode after expiration of the adjusted device sleep time.

* * * * *